United States Patent [19]
Ide et al.

[11] Patent Number: 5,687,923
[45] Date of Patent: Nov. 18, 1997

[54] GRADUAL PRESSURE APPLYING TYPE DE-INKING DEVICE FOR PAPER MATERIAL

[75] Inventors: Tetsuo Ide; Takefumi Ide, both of Fuji, Japan

[73] Assignee: Kabushiki Kaisha Taizen, Shizuoka, Japan

[21] Appl. No.: 614,015

[22] Filed: Mar. 12, 1996

[30] Foreign Application Priority Data

Aug. 5, 1995 [JP] Japan .................................. 7-219631

[51] Int. Cl.$^6$ .................................................. B02C 19/22
[52] U.S. Cl. .................................................. 241/260.1
[58] Field of Search ........................ 162/56, 234, 147, 162/189, 261; 241/260.1, 65, 165.5, 152.1

[56] References Cited

U.S. PATENT DOCUMENTS

| | | | |
|---|---|---|---|
| 4,512,523 | 4/1985 | Higashimoto | 241/260.1 X |
| 4,838,995 | 6/1989 | Klausen | 241/260.1 X |
| 4,865,259 | 9/1989 | Collette | 241/260.1 X |

FOREIGN PATENT DOCUMENTS 1327960  8/1987  U.S.S.R. .......................... 241/260.1

*Primary Examiner*—Mark Rosenbaum
*Attorney, Agent, or Firm*—Armstrong, Westerman, Hattori, McLeland & Naughton

[57] ABSTRACT

The present invention provides a gradual pressure applying type paper deinking device in which material for manufacturing paper is fed by cylinder presses. The deinking device includes: three cylinders arranged in an approximately triangular shape when viewed from the side. At least the first cylinder of the three cylinders having an inner cylinder in which a plurality of small holes are formed and an outer cylinder covering the inner cylinder. Each of the three cylinders have a rotating shaft which has an independent driving device. Each of the rotating shafts pass through an associated one of the three cylinders. A revolving group of spiral revolving blades is attached to each rotating shaft. On the remaining portion of the rotating shaft in a direction that crosses the peripheral direction of the rotating shaft at a slanted angle, crossing crushing blade-equipped kneading blades are provided. Adjacent kneading blades cross each other at a slanted angle and are attached in blocks with a plurality of freely exchangeable insert blades. Because at least the first cylinder of the three cylinders has an inner cylinder in which holes are formed, water can be actively removed and discharged from the start so that highly effective deinking treatment can be carried out regardless of the type of paper material.

1 Claim, 3 Drawing Sheets

GRADUAL PRESSURE APPLYING TYPE DE-INKING DEVICE FOR PAPER MATERIAL

FIELD OF THE INVENTION

This invention relates to a gradual pressure applying type deinking machine which deinks and bleaches paper material from old paper.

BACKGROUND OF THE INVENTION

With the recent spread of automated office machines, toner type ink paper and thermal sensitive type paper have been mixed together with ordinary printing ink type paper resulting in many different kinds of old paper material. There were problems with the emulsified dispersion of the ink when dealing with this paper material using previously known methods or existing equipment. After treatment, the ink particles would be large and black resulting in the degradation of the quality of the resulting paper product. It has been extremely difficult to remove residual carbon and an efficient way to do so has been needed.

It has also been necessary to improve the water removal efficiency depending on the type of paper material.

In the prior art, a gradual pressure applying type chemical infiltration process device related to deinking process devices is known. (Refer to Japanese Examined Utility Model Application 55-9676.) In a heated environment, the paper material is mixed and treated. The leakage of steam is prevented by eccentric pressure plates and thus, the need for bleaching chemicals is reduced.

Also, with devices which are equipped with a deinking cylinder and in which the paper material is delivered by cylinder presses and by highly concentrated mixing, the agitating, washing, compression, water removal, heating and pressurized transfer processes are carried out by a paper material deinking device which is known. (Refer to Japanese Unexamined Patent Application 2-221478.) The prior art device includes numerous suitably positioned cylinders which are coupled with a raw material charge inlet and a coupled introduction inlet. The prior art device also includes rotating shafts have independent driving sources and pass through the numerous cylinders. Furthermore, spiral eccentric plates are attached to a part of the rotating shafts, and kneading blades are insertably and exchangeably attached to the remaining part of the rotating shafts, with the kneading blades attached in blocks.

However, with the prior art technology described above, it is not possible to satisfy the demands for improved paper product quality and production efficiency that are required in the industry today. With the device described in Japanese Examined Utility Model Application 55-9676, in order to increase whiteness of paper by removing undissolved ink and carbon residual, the rotating shaft is rotated excessively resulting in the shaft becoming hot and flexing. However, when the rotation is kept from being excessive such that heat does not build up, sufficient whiteness cannot be obtained. Also, a lot of bleaching chemical can be added to increase whiteness but there are limits to how much can be added. It is not particularly economical and there are problems with pollution.

With the pressure type deinking device described in Japanese Unexamined Patent Application 2-221478, the structure for reversing the direction of flow and the rotating spiral blade group for agitating, compression, heating and crushing perform well, but the washing and water removal does not perform sufficiently.

In consideration of these problems the purpose of this invention is to provide a pressure type deinking device having a simple structure which includes rotating shafts with independent driving sources. The rotating shafts pass through three cylinders, one of which has an inner cylinder in which there are holes. Spiral revolving blade groups are attached to these rotating shafts. Attached to the kneading blades are crossing, crushing blades which are arranged to cross the peripheral direction of the rotating shaft at a slanted angle such that neighboring kneading blades cross each other and are attached to the remaining portion of the rotating shaft. The kneading blades are insertably and exchangeably attached in a plurality of blocks. Each cylinder is able to reverse the flow of paper material to effectively carry out all the operations of agitating, washing, compressing, water removal, heating and crushing.

SUMMARY OF THE INVENTION

In order to solve the above problems, the gradual pressure applying type paper deinking device of the present invention in which material for manufacturing paper is fed by cylinder presses is provided. The deinking device of the present invention includes three cylinders arranged in an approximately triangular shape when viewed from the side. The first cylinder is able to gradually lower to the third cylinder despite being connected. A raw material inlet is provided at one end of the first cylinder. A first connecting member is provided at the other end of the first cylinder. A second connecting member is provided on the side opposite the first connecting member which is connected to the second cylinder, such that the second connecting member is coupled to the third cylinder. A product discharge outlet is provided on the side opposite second connecting member. The three cylinders are coupled such that paper stock flows between the cylinders from the right side to the left side, then from the left side to the right side and then from the right side to the left side in a zigzag fashion. With respect to three cylinders at least the first cylinder has an inner cylinder in which numerous small holes are formed and an outer cylinder covering the inner cylinder. Each of the three cylinders have a rotating shaft, which has an independent driving device, and which passes through each cylinder. A revolving group of spiral revolving blades is attached to each rotating shaft. On the remaining portion of the rotating shaft, in a direction that crosses the peripheral direction of the rotating shaft at a slanted angle, crossing crushing blade-equipped kneading blades are provided. The kneading blades which cross each other at a slanted angle are attached in blocks with numerous freely exchangeable insert blades. Thus, the deinking device of the present invention consequently can achieve excellent agitation, washing, compression, water removal, heating crushing and pressurized transfer being carried out by high concentration mixing in which the flow of the paper material is reversed.

In the prior art technology the deinking ability was improved by injecting steam in order to heat up the raw material. In comparison to this, in this invention the insides of the three cylinders are arranged in a triangular shape when seen from the side such that the flow of the paper material is reversed at each cylinder and flows in a zigzag fashion. The first cylinder can be lowered to the third cylinder despite being coupled. Of the three cylinders at least the first cylinder has an outer cylinder that covers an inner cylinder in which many small holes are formed. Spiral revolving blades are attached to rotating shafts which have independent driving devices attached and which pass through each of the cylinders. Kneading blocks are attached in a direction that crosses the peripheral direction of the rotating shaft at a slanted angle. Crossing, crushing blades are attached to the kneading blades. The kneading blades are arranged to cross the peripheral direction of the rotating shaft at a slanted angle such that neighboring kneading blades cross each other. The kneading blades are insertably and exchangeably attached in numerous blocks. This deinking device consequently can achieve excellent agitation, washing, compression, water removal, heating crushing and pressurized transfer.

The device of this invention also does not require a large driving source. The direction of flow of the paper material can be changed at each cylinder and the crushing is carried out by the kneading blades which are equipped with crushing blades that cross. Consequently, it is not necessary to spray steam as in the prior art, making the deinking machine more efficient.

DETAILED DESCRIPTION OF THE INVENTION

DETAILED DESCRIPTION OF THE INVENTION

Figure 1:
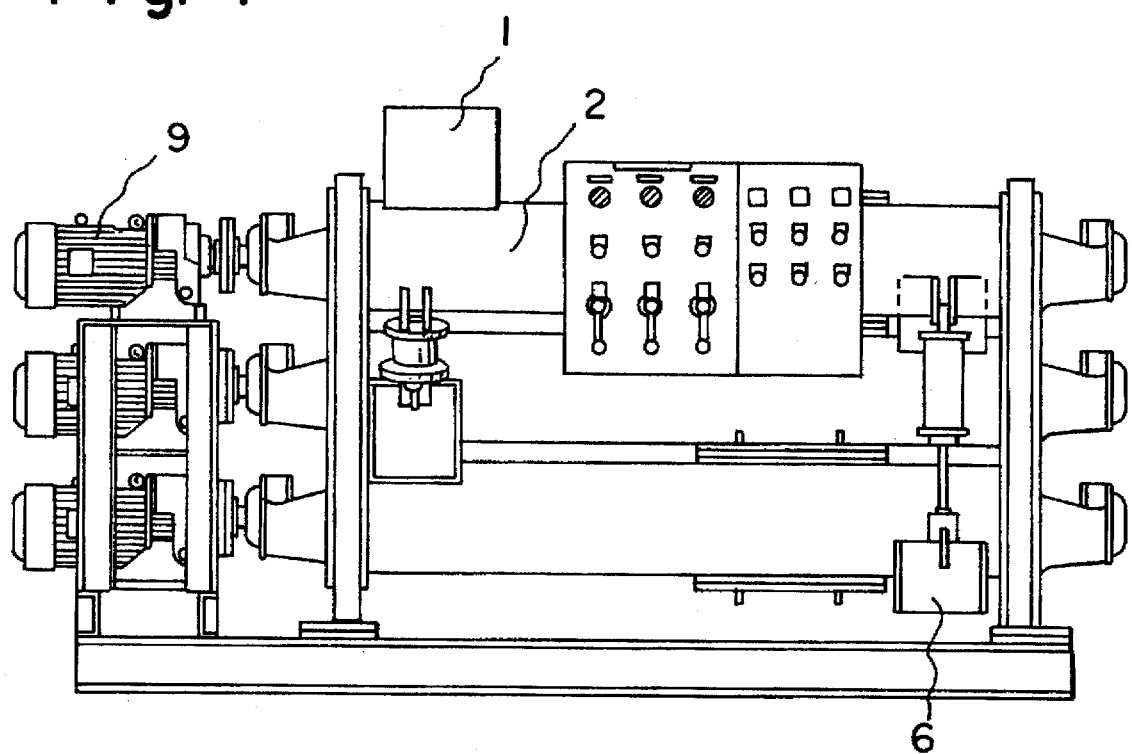
FIG. 1 is a front view of an embodiment of the pressure type deinking device of the present invention.
Figure 2:
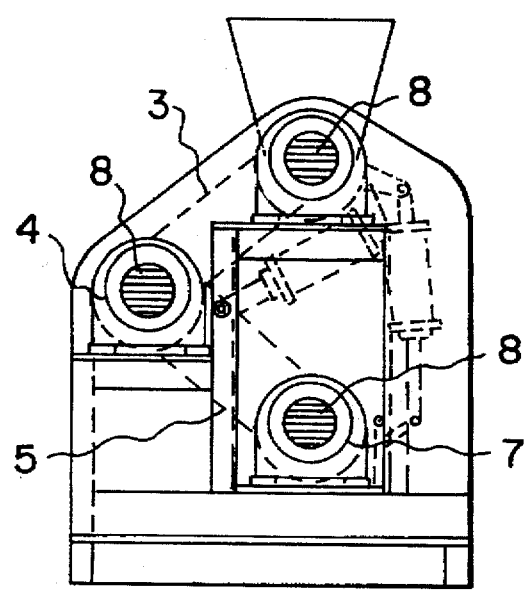
FIG. 2 is a side view of the above-mentioned embodiment.

The following is a detailed description of an embodiment of the present invention in reference to the drawing figures. As shown in FIGS. 1 and 2, the three cylinders are arranged in a triangular fashion when seen from the side and the first cylinder can be gradually lowered to the third cylinder despite being coupled.

Figure 3:
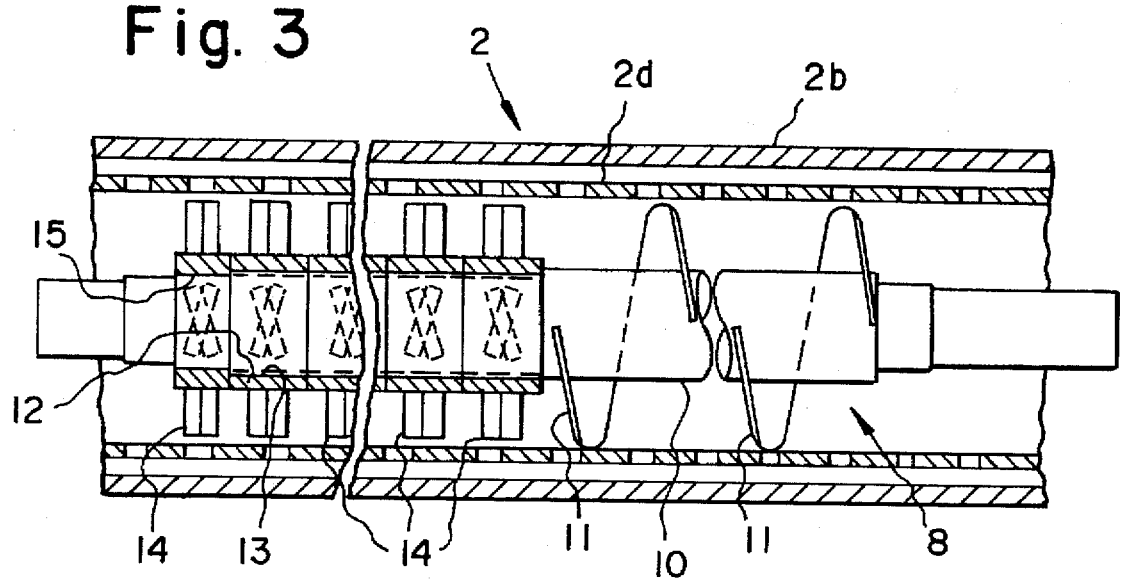
FIG. 3 is a front view of the main component of the above-mentioned embodiment (i.e., of the rotating shaft, which is equipped with kneading blades in blocks that have crossing crushing blades, and with spiral revolving blades inside the first cylinder, which has an inner cylinder with holes).

The first cylinder has an outer cylinder 2b which, as can be readily understood from FIG. 3, covers the inner cylinder 2a (made of punched metal, for example). The inner cylinder 2a has many small holes formed in it. Raw material for paper is fed by cylinder presses or similar and the three cylinders, including the first cylinder 2 having the internal cylinder 2a with the holes in it, into the raw material charge inlet 1 (a hopper, for example). The first connecting member 3, which connects the first cylinder 2, is provided on the side opposite to the side where the raw material charge inlet 1 of the first cylinder 2, is provided. The first connecting member 3 is connected to one end of the second cylinder 4. The first cylinder 2 having an inner cylinder 2a with holes in it is made of a material such as stainless steel (for example punched metal). In this way, water can be actively removed at the same time that the spiral revolving blades of the rotating shaft and numerous kneading blades attached to the rotating shaft so as to cross, carry out the agitation, washing, compression, heating, crushing and pressurized transfer. The dirty water that is removed collects in the U-shaped outer cylinder and is discharged from the discharge outlet. A second connecting member 5 for connecting the third cylinder 7 is provided on the side opposite the first connecting member 3, which is connected to the second cylinder 4. The second connecting member 5 is connected to one end of the third cylinder 7 and a product discharge outlet 6, equipped with a pressure regulating valve, is provided on the third cylinder 7 on the side opposite the second connecting member 5 of the third cylinder 7.

The flow from the first cylinder to the second cylinder and from the second cylinder to the third cylinder is reversed at each cylinder by the connecting members. The rotating shafts 8, which pass through the first to the third cylinders, are provided with independent rotation driving devices 9 (for example, a geared motor). The arrangement of the first to the third cylinders as viewed from the side does not have to be as shown in the drawings, but may be an equilateral triangle shape or may be designed in many different ways to fit the building or the arrangement with other related machinery. The location of attachment of the raw material charge inlet 1, the individual connecting members 3, 5 and the product discharge outlet may be suitably arranged in consideration of efficiency.

The above was a description of a device in which only the first cylinder 2 had an inner cylinder 2a with a numerous holes. However, the second and the third cylinders may also have inner cylinders 2a with many small holes formed in them. In this case, of course, the inner cylinders 2a are covered by outer cylinders 2b.

Figure 4:
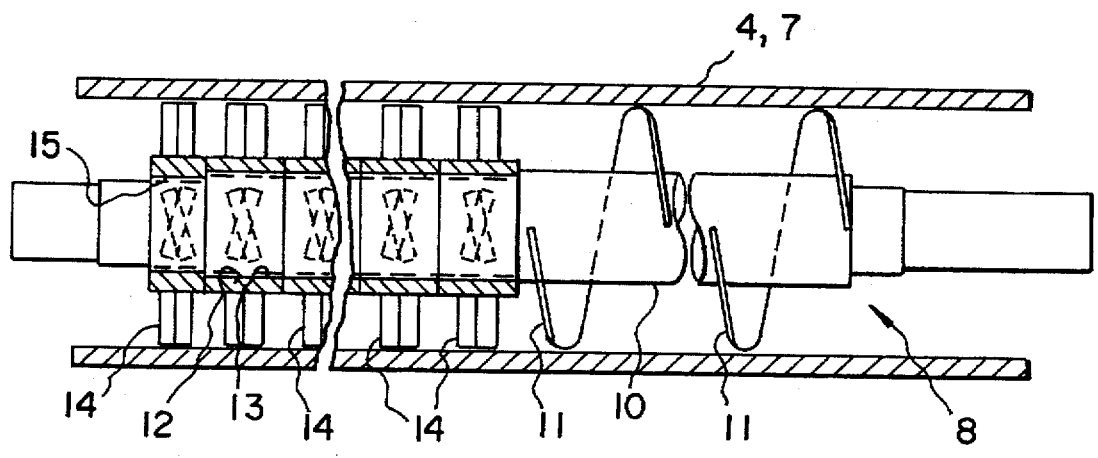
FIG. 4 is a front view of the main component of the above-mentioned embodiment (i.e., of the rotating shaft, which is equipped with kneading blades in groups that have crossing crushing blades, and the spiral revolving blades in the second and third cylinders).
Figure 5:
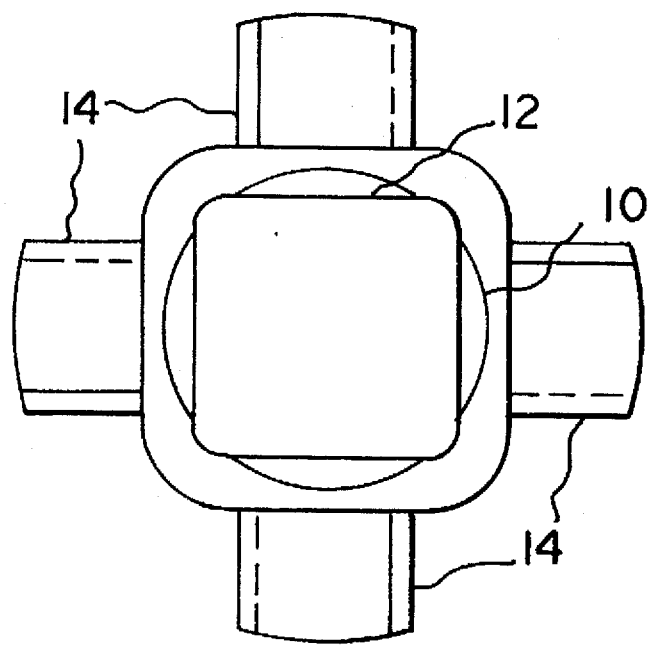
FIG. 5 is a partial side view of the crossing crushing blades-equipped kneading blade, which is a main component of the above-mentioned embodiment.

The following is a detailed description, based on FIGS. 4 and 5, of the rotating shaft that passes through the first to the third cylinders. This rotating shaft is supported at one end by the first cylinder 2, which has an inner cylinder 2a with small holes formed in it as is shown in FIG. 3, and the second cylinder 4 which does not have an inner cylinder 2a with small holes formed in it as is shown in FIG. 4, and a bearing (not shown) provided inside the third cylinder 7. The rotating shaft is rotatably supported at the other end by a driving device 9.

Spiral revolving blades 11 are provided as one unit on the cylinder rotating shaft 10. The spiral revolving blades 11 are placed a suitable length from the raw material discharge outlet in the first cylinder 2. The cylinder rotating shaft 10 is provided inside the cylinder such that it can rotate freely. From where the spiral revolving blades come to an end, the cylinder rotating shaft is formed into a multi-sided rotating shaft. Holes 13 are provided in the multi-sided rotating shaft 12 for fitting the crossing crushing blade equipped plurality of kneading blades 14 such that they cross the peripheral direction of the rotating shaft at a slanted angle. The neighboring blades cross at a slant and at a suitable angle, each blade is alternately reversed. The kneading blades are provided in blocks and are insertable into the multi-sided rotating shaft 12. The block having the kneading blades 14 which are equipped with crossing crushing blades, is attached by a screw 15. The number of blocks, which have a plurality of crossing kneading blades 14, to which are attached crossing crushing blades, can be varied in response to the raw material in order to deal with a variety of different raw materials.

The blocks having a plurality of crossing kneading blades 14 to which are attached crossing crushing blades, can be changed freely. Thus, by having kneading blades with crossing crushing blades attached at a variety of different angles ready, it is possible to deal with a wide variety of raw material for deinking. As shown in the drawings the crossing crushing blades attached to the kneading blades 14 are attached at a suitable angle so that they cross. When the kneading blades 14 rotate, the paper material is crushed into small pieces and at the same time is transferred to the right by the rotation of one of the crossing blades and to the left by the rotation of another crushing blade. The paper material isuntwisted with each pass through each kneading blade section and collides going to the left and the right with the rotation. This colliding action causes the temperature to rise promoting the separation and dissolution of the undissolved ink and carbon residual. When the final washing occurs this undissolved ink and carbon residual is washed out with the water, thereby effectively improving the whiteness.

Also, because these kneading blades, which are equipped with a plurality of crushing blades, are inclined at an angle and are attached so that each blade is alternately reversed, when the paper material flows through each cylinder, the operating force in the thrust direction is alternately directed to the left and to the right by the crossing crushing blade equipped kneading blades, thereby canceling the operating force. This results in an extremely smooth flow of the paper material.

Although not shown in the drawings, it is a matter of course that a water inlet for filling each cylinder with water and a chemical inlet are provided and that for the first, second and third cylinders a water discharge outlet, equipped with a filter, is provided for discharging the water removed from the paper material. (This is the dirty treatment water that contains ink or similar.)

With the above mentioned structure, it is possible to remove with high efficiency the color spots (undissolved ink, carbon residual), which were formerly very difficult to remove. Consequently, regardless of the type of paper material, when the paper material is filled by way of the raw material charge inlet while pressure is being applied by the cylinder presses, the paper material has the water forcibly squeezed out in the direction of the crossing crushing blade-equipped kneading blades 14 by the spiral revolving blades 11, which are rotated by the rotating shaft 8 which is equipped with crossing crushing blades and spiral revolving blades that pass through the first cylinder. The rotation at the same time results in agitation, compression and water removal of the paper material which is kneaded and pushed through.

The water that is removed from this paper material, which is agitated, compressed, dehydrated, kneaded and forced through, is discharged through the holes in the outer cylinder and out the discharge outlet. At the same time, the paper material is heated by the friction generated between the crossing crushing blade-equipped kneading blades 14, the inner cylinder 2a with holes of the first cylinder 2 and the spiral revolving blades 11. The angle at which the crushing blades are attached to the kneading blades 14 is inclined and alternately reversed. Consequently, a certain amount of air pressure is applied to the paper material in the second cylinder 4 to force it along in the second cylinder 4 while it is being shook from left to right and agitated.

Then, this is reversed and the operation performed inside the first cylinder 2 is similarly performed in the second cylinder 4 for further agitation, water removal, compression, mixing, heating and then crushing. The paper material is then transferred to the third cylinder 7 where the same operation is performed to deink the paper material, and bleaching chemical is added to carry out the bleaching operation at the same time.

The following is a detailed description of each of the operations. Agitation is performed by the rotation of the rotating shaft 8, which is equipped with kneading blades that have crossing crushing blades and with spiral revolving blades, inside the cylinder.

Washing is similarly effectively performed by the rotation of the rotating shaft 8, which is equipped with kneading blades that have crossing crushing blades and with spiral revolving blades, inside the cylinder, which causes agitation and compression. Particularly in the case of the first cylinder 2, dirt dissolves into the moving water and is actively removed from the inner cylinder 2a with holes for further improvement in the washing.

Compression and pressurized transfer are forcibly performed by the force of the cylinder press and by being pushed by the inclined plane of the revolving blades that are rotated by the rotating shaft 8, which is equipped with spiral revolving blades 11.

Water removal is substantially performed by the above-mentioned compression and pressurized transfer. Moreover the water is discharged through the holes formed in the inner cylinder 2a of the first cylinder 2 and through the outer cylinder 2b.

Heating occurs due to the friction heat generated by the pressurized transfer in a zigzag fashion in the three cylinders and the friction heat generated between the paper material and the spiral revolving blades 11 inside the cylinder. Friction heat occurs from the high pressure inside the cylinder that occurs from the delivery pressure of the paper material and the pressure adjustment at the discharge outlet. There is also heat generated by the crushing operation of the kneading blades, which are equipped with crushing blades that cross. An untwisting operation results from the advance of the paper material in the right direction by one crushing blade and in the left by another crushing blade. The repetition of this conflicting motion also generates friction heat.

This untwisting operation helps to reduce the thrust load on the rotating shaft to a certain extent. As it is desirable to cause the paper material to collide, the paper material can be made to move effectively from right to left by rotation if the direction of the crushing blades is changed alternately. As can be understood from this the functions of agitation, washing, compression, water removal, crushing, heating and reverse transfer are all carried out by the rotation of the rotating shaft 8, which is equipped with spiral revolving blades 11 and crossing crushing blade-equipped kneading blades 14.

In order to improve the completeness of the deinking, there are three stages of cylinders which have rotating shafts equipped with spiral revolving blades 11 and kneading blades 14 that have crossing crushing blades.

As was described above, the first cylinder of this device squeezes, compresses, kneads and heats by steam, and crushes the paper material while at the same time by repeating the process of removing the dirty water through the small holes. The undissolved ink and carbon residual is separated and decomposed resulting in effective color spot removal and improved whiteness. Also, by reversing the direction of flow, a high degree of mixing is achieved and the intertwining of the fibers is improved with the result that there is less paper tearing for greatly improved production efficiency.

Also, because the paper material is transferred within the three cylinders in a zigzag fashion, fiction heat is generated in a wide range. At the same time, the friction heat generated between the paper material and the crossing crushing blade-equipped kneading blades and the spiral revolving blades causes the temperature to rise between approximately 30 to 90 degrees or more. This compresses, heats and steams the material resulting in improved permeation and uniformity of the bleaching chemical. This makes it possible to obtain the maximum effect using less chemicals, thereby greatly decreasing the amount of chemicals used and making it possible to use less power in relation to the amount being treated, which results in decreased running costs. Not only is the cost reduced because the structure of the device is simple, but it is possible to operate for extended periods of time with few breakdowns.

In order to perform the deinking treatment most economically, water is actively removed by the first and second cylinders. Bleaching chemicals (for example caustic soda) are added in the third cylinder and during water removal, and chemicals are added to perform the bleaching treatment. Based on tests, it was possible to obtain sufficient bleaching even if granulated hot melt is mixed in.

Based on the above structure this invention is able to (1) At least the first cylinder has an inner cylinder with holes formed in it so it is possible to actively remove dirty water from the start and discharge it. Consequently, it is possible to highly effectively deink any type of paper material.

(2) The paper material is transferred within the three cylinders in a zigzag fashion which generates friction heat. The friction heat generated between the paper material and the crossing crushing blade-equipped kneading blades and the spiral revolving blades causes the temperature to rise between approximately 30 to 90 degrees, or more. This heat increases the permeation of the chemicals, thus reducing the amount of chemicals required. At the same time, the undissolved ink and residual carbon mixed with the paper material are separated and decomposed by the crushing blades so that the deinking treatment time can be reduced, which results in power savings.

(3) The paper material transferred by the cylinder presses is gradually agitated, washed, compressed, crushed, dehydrated, heated and transferred by the concentrated mixing in the three stages of cylinders. The direction of the flow is reversed a number of times to greatly improve the deinking effect.

(4) Instead of using a chain drive, the three cylinders are each driven directly by a driving member and as the bearings are provided in housings, it is possible to use the most effective motor. There is no chain noise and no worries about chain life and as each cylinder is independent, inspection and maintenance can be carried out one cylinder at a time. Depending on the raw material, the power to each cylinder can be individually adjusted. The number of crushing blades on the kneading blade inside the cylinder can be increased by changing the structure to further increase the kneading effect.

Description of the Reference Numerals 1 raw material inlet
2 first cylinder
3 first connecting member
4 second cylinder
5 second connecting member
6 product discharge outlet
7 third cylinder
8 rotating shaft
9 driving device
10 round rotating shaft
11 spiral revolving blades
12 multi-sided rotating shaft
13 holes
14 kneading blades equipped with crossing crushing blades
15 threaded portion

What is claimed is:

1. A gradual pressure applying type paper deinking device in which material for manufacturing paper is fed by cylinder presses the deinking device comprising:

three cylinders arranged in an approximately triangular shape when viewed from a side of said deinking device, a first cylinder being able to gradually lower to a third cylinder despite said first cylinder being connected to said third cylinder, and a raw material inlet being provided at a first end of said first cylinder;

a first connecting member, provided at a second end of said first cylinder;

a second connecting member provided on a side opposed to the first connecting member connected to a second cylinder, said second connecting member being coupled to said third cylinder and a product discharge outlet being provided on a side opposed to said second connecting member;

said three cylinders being coupled such that paper stock flows between said three cylinders from right to the left, then from left to right and then from right to left in a zigzag fashion;

at least one of the cylinders having an inner cylinder in which a plurality of small holes are formed and an outer cylinder covering said inner cylinder;

each of said three cylinders having a rotating shaft having an independent driving device, wherein each of said rotating shafts passes through its corresponding cylinder;

a revolving group of spiral revolving blades being attached to each rotating shaft leaving only a remaining portion of the rotating shaft; and on said remaining portion of said rotating shaft in a direction that crosses a peripheral direction of said rotating shaft at a slanted angle, crossing crushing blade-equipped kneading blades are provided, wherein adjacent said kneading blades cross each other at a slanted angle, and are attached in blocks with a plurality of freely exchangeable insert blades so that agitation, washing, compression, water removal, heating, crushing and pressurized transfer are carried out by high concentration mixing in which flow of said material for manufacturing paper is reversed.

* * * * *